United States Patent [19]
Johnson

[11] 3,804,699
[45] Apr. 16, 1974

[54] SLIP-RESISTANT MAT

[75] Inventor: Donald C. Johnson, Fremont, Ohio

[73] Assignee: Ludlow Corporation, Needham Heights, Mass.

[22] Filed: June 25, 1971

[21] Appl. No.: 156,764

[52] U.S. Cl. ............ 161/39, 15/217, 161/63, 161/67, 161/89, 161/94, 161/95, 161/145, 161/160, 161/190, 161/247, 156/299, 156/324, 296/1 F
[51] Int. Cl. ....... A47g 27/02, B32b 5/18, B60r 3/04
[58] Field of Search ......... 161/41, 67, 84, 160, 190, 161/247, 63, 64, 66, 89, 94, 95, 96, 159, 62, 39, 145; 296/1 F; 156/254; 15/215, 216, 217

[56] References Cited
UNITED STATES PATENTS

| | | | |
|---|---|---|---|
| 1,755,978 | 4/1930 | Campbell | 161/94 |
| 3,360,422 | 12/1967 | Desch | 161/95 |
| 3,515,622 | 6/1970 | Jordan | 161/67 X |
| 3,576,706 | 4/1971 | Baumann et al. | 161/190 X |
| 3,400,039 | 9/1968 | Mason et al. | 161/63 |
| 3,698,973 | 10/1972 | Wisotzky et al. | 161/66 |

FOREIGN PATENTS OR APPLICATIONS

| | | | |
|---|---|---|---|
| 971,958 | 5/1963 | Great Britain | 161/67 |
| 1,040,573 | 2/1963 | Great Britain | 161/64 |
| 1,081,568 | 9/1965 | Great Britain | 161/64 |
| 224,257 | 6/1958 | Australia | 161/67 |

*Primary Examiner*—George F. Lesmes
*Assistant Examiner*—Charles E. Lipsey
*Attorney, Agent, or Firm*—Cesari and McKenna

[57] ABSTRACT

A mat especially useful for protecting carpeted surfaces from dirt, moisture, or wear. The mat consists of a carpeting fabric bonded to a slit foam, e.g., polyurethane foam, by a quantity of bonding resin composition which is characterized by its weight and limited flexibility. A convenient bonding resin composition is that of the type based on plastisols of poly(vinylchloride) in a quantity of from at least 2 lbs. per square yard of mat.

6 Claims, 3 Drawing Figures

PATENTED APR 16 1974

3,804,699

INVENTOR.
Donald C. Johnson
BY
Cesari & McKenna
ATTORNEYS

SLIP-RESISTANT MAT

BACKGROUND OF THE INVENTION

It has been a problem to provide carpet-protective mats which do not move when there is pedestrian traffic thereover.

In entryways to office buildings and other heavy traffic areas, such protective mats are used frequently to protect relatively expensive carpeting. When the mats are moved out of position by foot traffic, they not only fail to provide the desired protection but also require re-positioning, and often present an unsightly appearance as they lap up against walls at the end of corridor, assume a skewed position with respect to other surroundings, etc.

A typical mat known to the prior art is a mat formed of fused poly(vinylchloride) backing sheet having a carpet facing integrated into the sheet. Such sheets do shift significantly when subjected to pedestrian traffic. The shifting is sometimes in a sideward direction near one end of the mat and is sometimes along the line of pedestrian traffic. Thus one important characteristic of the mat is that it does not tend to wrinkle in any direction, thereby tending to walk (as in a manner reminiscent of a caterpillar's movement), during its use.

There have been a number of attempts made in the prior art to form mats which resist movement on carpeted surfaces. For example, spikes or other such projections have been molded into the backing surface of the aforesaid poly(vinylchloride) based mats. Such projections have reduced movement of the mats to some extent, but not enough to solve the problem. Thus, there remained a substantial need for providing improved carpet-protecting mats.

It should be noted that while a prime problem solved by the use of effective creep-resistant mats is that problem associated with pedestrian traffic on flat surfaces, such mats also have an especially high utility when they are used to cover other surfaces which present problems with respect to movement of mats. For example, the covering of sloped and irregularly-shaped carpeted surfaces of automobiles present a particularly important utility for mats constructed according to the invention. Such surfaces, because of the slopes and the various directions of slopes, must be provided with a highly movement-resistant pad in order to avoid wrinkling, bunching up, slipping, etc.

SUMMARY OF THE INVENTION

It is an object of the invention to provide an improved movement-resistant mat for use in protecting carpeted surfaces.

It is another object of the invention to provide an improved mat which, isotropically, resists movement from forces exerted thereupon over a wide variety of angles and directions.

It is a further object of the invention to provide a protective mat which is particularly suitable for use on a sloped and irregularly shaped surface.

Another object of the invention is to provide a superior carpet-protective mat which can be formed at moderate cost from readily-available commercial materials.

A further object of the invention is to provide novel processes for protecting a flat carpeted surface and for protecting an irregularly sloped carpeted surface.

Another object of the invention is to provide a novel process for making an improved mat of the type described herein.

Other objects of the invention will be obvious to those skilled in the art on reading this patent.

The above objects have been substantially achieved by construction of a mat having (1) a gripping layer of a resilient polymeric, slit-foam, (2) a facing layer which is advantageously a carpeted fabric, and (3) a bonding layer which contributes required mass and limited flex characteristics to the mat.

The slit-foam gripping layer is formed by slitting of a closed cell foam of low density. The foam is formed of a synthetic polymer such as a polyurethane or the like. The foam is advantageously resilient so that its coefficient of friction increases when weight of a pedestrian's foot is applied thereto. A foam which has been found to be particularly useful is slit polyurethane film of about 1.5 to 5 lbs per cubic foot in density, but most advantageously of between 1.5 to 3 lbs. per cubic foot in density. Slit polyurethane foam is usually produced by slicing a continuous layer of foam from the cylindrical surface of a cylindrical block of the foam as the block rotates on its axis. The surface of a sheet of slit polyurethane foam is a cut, i.e., a "slit," surface because the knife which slices off the layer of polyurethane foam cuts through the cells of the foam. Such slit surfaces are highly "pocked" with half-cells which, as will be seen below, serve the function of facilitating bonding of the foam to the rest of the mat as well as serve the function of reducing slip on an underlying carpet.

The slit foam is advantageously from about 0.04 to 0.15 inches in thickness. At such thicknesses, the non-slip characteristics of the foam are realized and, moreover, the operation of bonding the foam to the bonding layer is facilitated. The bonding resin composition displaces enough air from the half cells to form a good bond with a considerable surface area of the polymeric foam. Yet there is also insufficient porosity to allow the binder to strike through the foam in such a way as to provide processing problems.

Slit polyurethane foam of desirable density and thickness is readily available commercially. The polyurethane foam may be either of the polyester or the polyether types, and may be produced as known in the art, e.g., as described in U.S. Pat. No. 2,764,565. Polyurethane foam has adequate heat resistance for use in the present method, is not affected by the plasticizers used in the intermediate layer of plasticized poly(vinylchloride). It is also sufficiently resistant to common organic cleaning solvents and, therefore, can be safely subjected to most commercial cleaning operations.

The bonding layer is a polymer, at least, which partially, impregnates one of the pocked surfaces of the slit foam and, similarly, bonds to the bottom of overlying facing layer. As a matter of economics and convenience, the polymer is usually applied in a liquid form at room temperature. Thus poly(vinylchloride) plastisol compositions are highly convenient for use because they are easily applied at relatively low viscosities and can be formulated to dry or cure at moderate temperatures without the formation of gas bubbles.

It is this bonding layer which provides the mass and isotropic wrinkle resistance to assure that the slit foam will resist lifting forces in traffic and remain in operable contact with the carpeting surface. This solid bonding layer must provide at least about 2 pounds mass per square yard of mat. It forms the sole adhesive between the facing and slit foam layers.

The preferred viscosity of a poly(vinylchloride)plastisol useful in forming the product of the invention is relatively high, (usually from 10,000 to 20,000 centipoises) and the viscosity of the plastisol may be increased by addition of fine asbestos fiber in an amount equal to about 0.2 to 3.0 per cent of the weight of poly(vinylchloride) in the plastisol or by other means known to the art.

The plastisol is conveniently formed of a dispersion in a plasticizer of a polyvinyl resin which may be either a homopolymer or a copolymer e.g. a copolymer (incorporating from 3 to 7 percent by weight of vinyl acetate. In each case, a typical average molecular weight of the polymer component of the plastisol composition is from about 50,000 to about 80,000.

The preferred plasticizers for use in the plastisol are the monomeric phthalate esters, such as dioctyl phthalate, diisooctyl phthalate, diisodecyl phthalate and butyl benzyl phthalate. These plasticizers may be blended with dioctyl adipate to obtain an improved flexibility with a polymeric plasticizer such as epoxidized soybean oil to improve heat resistance, or with a phosphate such as tricresyl phosphate to improve flame retardance.

The cost of the product may be reduced by incorporating in the plastisol an inert filler such as ground limestone or soft clay.

Another way of reducing costs consists in causing small bubbles of gas to be trapped in the polyvinyl plastisol, thus making possible a reduction of 5 to 15 percent in the weight of plastisol required per square yard.

For example, the cellular intermediate layer of plasticized poly(vinylchloride) may be produced by incorporating in the plastisol a chemical blowing agent, such as an amount of diazodicarbonamide equal to about one-fourth to 1% by weight of the poly(vinylchloride). During the fusing of the plastisol, the blowing agent decomposes to form small bubbles of gas to form a cellular structure, the amount of voids being proportionate to the amount of blowing agent used.

An alternative method of producing a cellular structure consists in adding a foaming agent, for example 0.5 to 2.0 parts of a silicone froth stabilizer, and then passing the plastisol through a mechanical frother, such as Oakes foamer, while introducing air under pressure.

The weight of plasticized polyvinyl chloride in the final product may vary from about 2.0 lbs. per square yard in small domestic mats to about 7 lbs. per square yard in large commercial mats, the amount of the plasticizer being from about 50 to about 70% and the amount of inert filler being up to about 30% of the weight of the polyvinyl chloride.

The facing layer will be any suitable facing material which can be properly anchored in the above-described bonding layer. Fabrics, especially carpet-grade fabrics, are most usually utilized but layers formed of flocking consisting of individual fibers embedded in the bonding layer can also be utilized where economics and wear specifications permit such use. A top layer of carpeting is resilient, provides an attractive appearance, functions to absorb water and mud when the mat is in use, and is the preferred facing layer. Most preferable is a tufted carpet produced by stitching loops of yarn into a woven or non-woven backing. Loops of yarn on the bottom layer of such carpeting become embedded in the plastisol layer. Preferably the tops of the loops are cut to form a cut pile surface, because such a surface is more effective in absorbing soil from shoes. Preferably the pile consists of a synthetic fiber such as nylon, polypropylene, polyester or acrylic yarn, because such synthetic fibers provide a pile surface which is easily cleaned, resistant to wear, and unaffected by light or moisture.

ILLUSTRATIVE EXAMPLE OF THE INVENTION

In this application and accompanying drawings are shown and described a preferred embodiment of the invention. Various alternatives and modifications thereof are suggested, but it is to be understood that these are not intended to be exhaustive and that other changes and modifications can be made within the scope of the invention. The suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

FIG. 1 of the drawing is a diagrammatic elevation of an apparatus for producing a mat in accordance with the invention.

DESCRIPTION OF THE PREFERRED EMBODIMENTS

Figure 1:
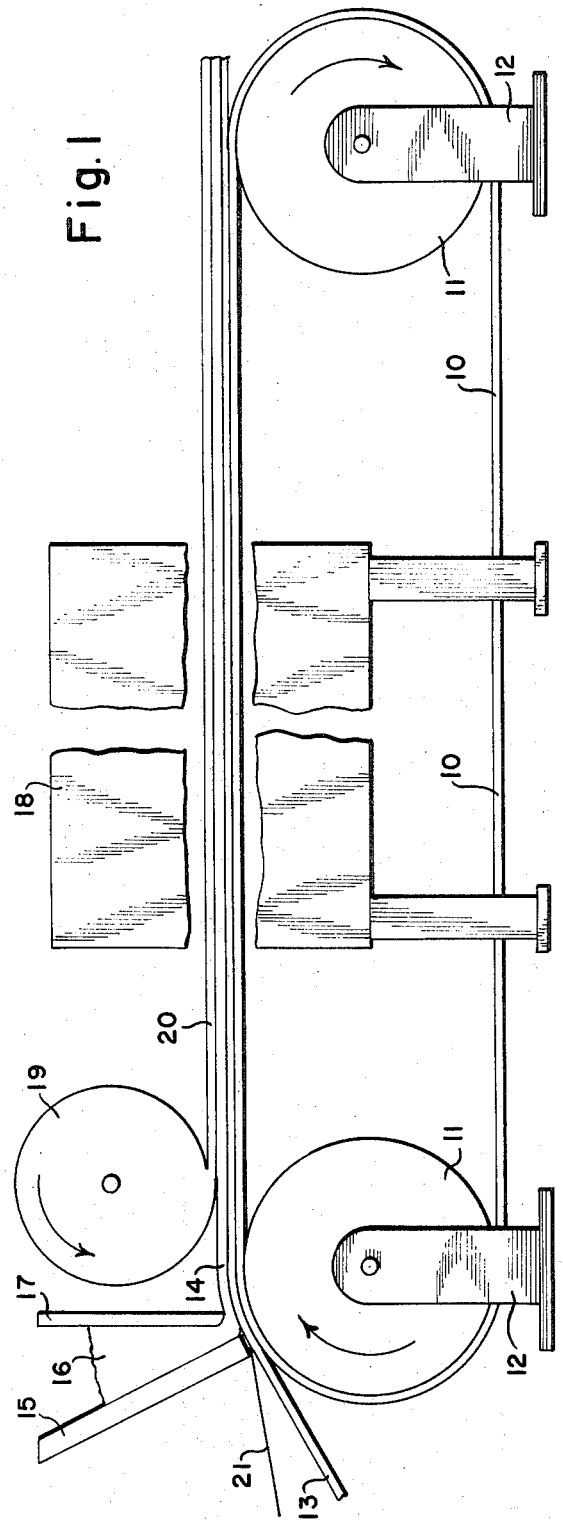

The apparatus shown in FIG. 1 may be used in producing a mat by the method of the invention. In that apparatus a continuously moving stainless steel belt 10 is carried on rolls 11 which are journalled in supports 12, one of the rolls 11 being driven at the desired speed.

A continuous strip of slit polyurethane foam 13 is drawn from a suitable source such as a supply roll and is carried on the surface of the stainless steel belt 10. In order to apply a layer of a poly(vinylchloride) plastisol on top of the slit polyurethane foam, to produce a gripping layer 14, a rear wall 15 for retaining a supply of bonding agent of poly (vinylchloride) plastisol 16 extends close to the upper surface of the entering strip of slit polyurethane foam 13, with just enough clearance between the rear wall 15 and roll 11 to permit the strip of polyurethane foam 13 to enter the apparatus. The plastisol 16, which may be replenished from time to time, is carried upon the strip of polyurethane foam 13 under a doctor blade 17 which levels the plastisol 16 to produce a gripping layer 14 of the desired thickness. For example, the doctor blade 17 may be set at a height of about 0.08 inch above the surface of the polyurethane foam 13, and the thickness of the strip of polyurethane foam may be about 0.06 inch.

Located between the doctor blade 17 and an oven 18 is a supply roll 19 by means of which a layer of carpeting 20 is laid on the surface of the poly(vinylchloride) plastisol. Preferably the supply roll 19 is driven at such a speed that the layer of carpeting 20 is deposited gently on the surface of the plastisol layer.

The oven 18 for fusing the plastisol preferably is of the circulating air type. If the temperature in the oven is between 290° and 350°F, and at the proper temperature for fusing the plastisol, the stainless steel belt 10 may travel at such a speed that the passage through the oven takes between 5 and 15 minutes.

The oven temperature which can be employed depends upon the nature of the carpeting, and should not be high enough to cause deterioration of the carpeting. The poly(vinylchloride) plastisol composition employed should be one which is capable of complete fusion at the temperature to which it is heated in oven 18.

Plastisol 16 is a viscous liquid because it consists of a suspension of particles of the poly(vinylchloride) in a plasticizer phase. During the passage through the oven 18, the intermediate layer 14 fuses into a single phase which upon cooling is a solid, flexible layer of plasticized poly(vinylchloride). Preferably the layer of carpeting 20 is somewhat narrower than the underlying layers of poly(vinylchloride) and polyurethane foam, as shown in the plan view of FIG. 2, so that a margin of plasticized poly(vinylchloride) 14 is exposed on both sides of the layer of carpeting 20.

Figure 2:
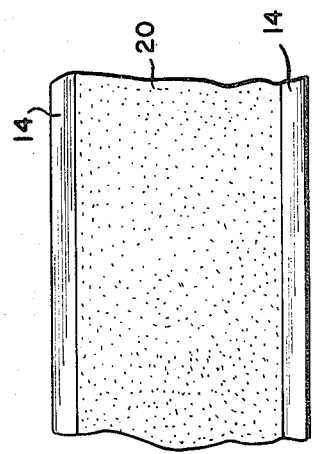
FIG. 2 is a fragmentary plan view of a mat produced by the apparatus of FIG. 1.

Also, the layers of polyurethane foam and poly(vinylchloride) may be continuous, while the carpeting layer 20 consists of successive strips, each of the desired length, which are laid on top of the plasticized poly(vinylchloride) layer 14. A gap is left between the successive strips of carpeting which has a width equal to approximately twice the width of one of the margins shown in FIG. 2. The finished product is then cut off at the middle of each of these gaps, so as to produce successive runners of the proper length, with a margin of plasticized poly(vinylchloride) exposed along both sides of each runner as shown in FIG. 2, and also exposed at both ends of each runner.

If each of the successive lengths of carpeting applied upon the layer of plasticized poly(vinylchloride) is relatively long, the resulting mats will be in the form of runners. If each of the successive lengths of carpeting used in the apparatus of FIG. 1 is relatively short, the product will be obtained in the form of relatively small rectangular mats.

The exposed margins of plasticized poly(vinylchloride) which are left around the periphery of each mat provide an attractive appearance and also make it less likely that anyone will trip on the edge of the mat because the margin around the layer of carpeting is relatively thin.

In the practice of the illustrated process method, it is necessary to use a poly(vinylchloride) plastisol of such a viscosity that it forms bonds both with the polyurethane foam and with the back of the carpeting layer, without striking through the film of polyurethane foam. Thus the viscosity of the plastisol 16 in the apparatus shown in FIG. 1 must be relatively high, so that a considerable amount of force is required to pull the polyurethane strip 13 through the bank of plastisol 16 and to overcome the shear at the doctor blade 17.

It has been found that when in the practice of the present invention, there is a strong back-pull on the material due to the viscous nature of the plastisol, long tubular wrinkles form wherever the layers of plasticized poly(vinylchloride) and the polyurethane foam are exposed at the margins as shown in FIG. 2. These long tubular wrinkles, if not prevented, would cause the exposed margins of poly(vinylchloride) and polyurethane foam to be very unsightly in the final product.

It has now been discovered that the formation of these longitudinal wrinkles can be prevented by laying a fiber layer which is porous enough to be penetrated by the bonding polymer immediately on top of the film of slit polyurethane foam before the layer of poly(vinylchloride) plastisol is applied.

For example, the fiber layer which is laid on top of the film of slit polyurethane foam may consist of an open-mesh woven fabric, such as a 14 × 10 count tobacco cloth cotton fabric. Alternatively, the reinforcing fiber may consist of longitudinally extending individual strands, such as strands of glass fiber or polyester yarn. In any case, the fiber layer resists the back-pull and thus prevents the longitudinal wrinkles from being formed. The fiber layer is concealed in the final product, because it extends between the film of slit polyurethane foam and the intermediate layer of plasticized poly(vinylchloride). Also, the open-mesh woven fabric or the individual strands in the fiber layer do not interfere with the bonding of the poly(vinylchloride) layer to the film of slit polyurethane foam which occurs during the fusing of the poly(vinylchloride) layer.

Figure 3:
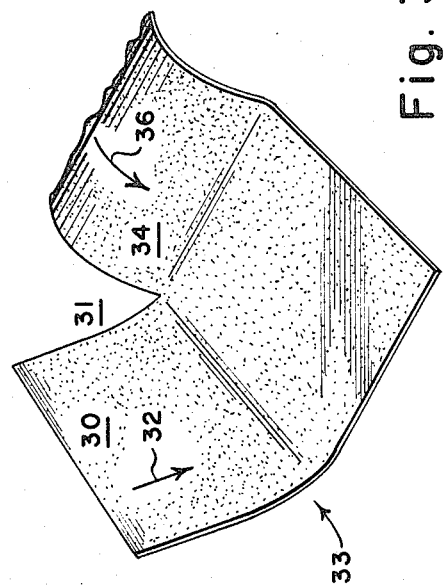
FIG. 3 is a plan view of an automotive mat formed according to the invention in place on an automotive surface.

FIG. 3 illustrates a particularly important and advantageous product of the invention whereby an automotive mat 33 is formed having flap sections adapted for bending upwardly (or downwardly) on to surfaces having slopes of different angles and directions. As in the usual case, such bending and forming is facilitated by use of cut-outs as at 31. Thus the mat of the invention when placed in the front seat of an auto resists movement in all directions with little or no wrinkling or creeping problems: For example, upwardly sloping flap 30 resists movement by forces associated with common heel movements even though they are usually at a very low angle with the mat and consequently have a relatively high vector 32 along the carpet surface.

Similarly sloped portion of mat 34, even though sloping at a 90° angle to flap 30 resists forces applied thereto along vector 36.

TEST RESULTS ON RUG CREEPING

The improved result produced by the present invention was demonstrated by testing three mats, each of which was 12 feet long and 27 inches wide. Each test was conducted by placing the mat on top of nylon cut pile carpeting in a corridor while the mat was subjected to normal foot traffic both crosswise and lengthwise of the mat, the traffic consisting of about one person every 90 seconds.

Three mats were tested on three successive days by leaving each mat in the corridor for a period of 4 hours under normal foot traffic. In each case, the initial position of the mat was marked, and at the end of four hours the amount of length-wise movement of the mat was measured. In addition, at the end of four hours the amount of crosswise movement of the mat was measured at one end where the greatest amount of cross traffic had occurred.

The first mat tested was a conventional mat consisting of a layer of carpeting on top of a layer of flexible plasticized poly(vinylchloride) adjacent the nylon pile. At the end of the test, this mat was found to have shifted lengthwise 1.25 inches, and was found to have shifted crosswise 3.25 inches at one end.

The second mat, tested for purposes of comparison, consisted of a layer of plasticized poly(vinylchloride) which had a grooved upper surface and had no overlying layer of carpeting. The underside of this mat was provided with pointed integral projection, each three-sixteenths inch long, which were spaced one inch apart over the underside of the mat, except for a border portion three inches wide on each side which had neither projections on the bottom nor grooves on the top.

At the end of the four-hour test of this mat it was found to have shifted lengthwise three-fourths inch, and to have shifted 2⅜ inches crosswise at one end.

The third mat tested was a mat prepared according to the process of the present invention. The mat was essentially the same as the first mat except that the third mat included the gripping layer of slit polyurethane foam to which the layer of plasticized poly(vinylchloride) had been fused and bonded. At the end of the four hour test, this mat had not moved lengthwise, and had not moved perceptibly sideways at either end. Moreover, this mat was left in the corridor for several days, and even at the end of that time no shifting of the mat from its original marked position could be visually detected.

In another test, the frictional resistance between a level loop, contract grade, polyester carpet and the mat of the invention was compared to the resistance between the same carpet and a mat which did not have the split foam backing layer. A force of 11 lbs per square foot was needed to move the mat of the invention; only 5.1 lbs per square foot was needed to move the sample with the usual poly(vinylchloride)-based backing. This test was carried out using carpets of 3.5 lbs/ft$^2$ and at a pull rate of 10 inches per minute. The slit foam was about 0.07 inches thick.

The remarkable improvement in stability of the mat under foot traffic which is obtained in the practice of the present invention is demonstrated by these tests.

EXAMPLE OF A BONDING COMPOSITION

In a typical procedure for producing a mat in the practice of the invention, a high shear mixer is charged with 285 parts by weight of poly(vinylchloride) in the form of a fine powder, 180 parts of dioctyl phthalate, 5 parts of a conventional zinc stabilizer, 113 parts of finely divided soft clay ground limestone, 33 parts of dioctyl phthalate-based dispersion and 12 parts of a dioctyl phthalate-based dispersion containing enough carbon black to give the desired black color to the product. The viscosity of the plastisol is adjusted to 14,500 centipoises, as measured on a Brookfield viscosimeter (No. 6 spindle at 20 rpm), by the incorporation of 7 parts of fine asbestos fiber.

After a homogeneous mixture has been obtained by means of the high shear mixer, the plastisol is deaerated in a slow speed gate mixer for 15 to 20 minutes.

An apparatus of the type shown in FIG. 1 is used to apply the plastisol 16 on top of a strip of slit polyurethane foam 13 which is 0.06 inch thick, has a density of 2.2 lbs. per cubic foot and consists of cells having a substantially uniform diameter of about 0.015 inch.

The doctor blade 17 is set at a height of 0.078 inch above the surface of the polyurethane foam, and an open-mesh 14 × 10 count tobacco cloth cotton fabric 21 is carried on the surface of the polyurethane foam. The layer of carpeting 20 which is laid on top of the plastisol layer is a nylon cut pile carpeting, with 32 tufts per square inch having a pile height of 7/16 inch and a pile weight of 21 ounces per square yard, stitched into a non-woven polyproplylene backing fabric with a weight of 4 ounces per square yard. The temperature of the oven 18 is 295°F, and passage through the oven takes 8 minutes.

After cooling, the finished product is trimmed to leave a margin of one inch of poly(vinylchloride) and polyurethane foam around the edges of the layer of carpeting. The finished product contains about 4 pounds of plasticized poly(vinylchloride) per square yard.

It is also to be understood that the following claims are intended to cover all of the generic and specific features of the invention herein described and all statements of the scope of the invention which might be said to fall therebetween.

What is claimed is:

1. A mat for protecting a carpeted surface against foot traffic consisting essentially of a facing layer of carpeting fabric, a gripping layer means to contact the surface to be protected and consisting of slit resilient polyurethane foam of from 0.04 to 0.15 inches in thickness and having a density of 1.5 to 5.0 pounds per cubic foot, and an intermediate and isotropic bonding layer consisting of 2 to 7 pounds per square yard of a fused vinyl resin plastisol bonded on one side thereof to loops of said carpeting fabric and on the other side thereof to said slit foam, said layer of carpeting fabric being non-coextensive with the bonding layer and the slit foam layer such that the mat is provided with a fabric free margin about the perimeter thereof formed of said bonding layer.

2. A mat as defined in claim 1 wherein said bonding layer is a poly(vinylchloride) composition.

3. A mat as defined in claim 1 wherein said bonding layer comprises an open-mesh fabric layer proximate said slit foam and embedded in said bonding layer.

4. A mat as defined in claim 2 wherein said bonding layer comprises an open-mesh fabric layer proximate said slit foam and embedded in said bonding layer.

5. A mat as defined in claim 1 having flaps and cut-outs forming means to conform said mat to sloped surfaces of the floor of an automobile.

6. A mat as defined in claim 2 having flaps and cut-outs forming means to conform said mat to sloped surfaces of the floor of an automobile.

* * * * *